(12) United States Patent
Mäkelä

(10) Patent No.: US 7,509,575 B2
(45) Date of Patent: Mar. 24, 2009

(54) OPTIMIZATION OF CONTENT

(75) Inventor: Mikko Mäkelä, Espoo (FI)

(73) Assignee: Nokia Corporation, Espoo (FI)

( * ) Notice: Subject to any disclaimer, the term of this patent is extended or adjusted under 35 U.S.C. 154(b) by 555 days.

(21) Appl. No.: 11/114,211

(22) Filed: Mar. 30, 2005

(65) Prior Publication Data

US 2006/0224955 A1 Oct. 5, 2006

(51) Int. Cl.
*G06F 17/00* (2006.01)

(52) U.S. Cl. .................. 715/238; 715/204; 715/229; 715/243; 715/273

(58) Field of Classification Search ............. 715/500, 715/500.1, 511, 513, 517, 526, 200, 201, 715/204, 229, 238, 243, 273
See application file for complete search history.

(56) References Cited

U.S. PATENT DOCUMENTS

| | | | |
|---|---|---|---|
| 2001/0050675 A1* | 12/2001 | O'Leary | 345/169 |
| 2002/0167939 A1* | 11/2002 | Weissman-Berman et al. | 370/352 |
| 2002/0174110 A1* | 11/2002 | Smith | 707/3 |
| 2003/0119492 A1* | 6/2003 | Timmins et al. | 455/414 |
| 2004/0049737 A1* | 3/2004 | Simon Hunt et al. | 715/513 |
| 2004/0133848 A1* | 7/2004 | Hunt et al. | 715/500 |
| 2005/0015772 A1* | 1/2005 | Saare et al. | 719/310 |
| 2005/0076296 A1* | 4/2005 | Lee et al. | 715/523 |
| 2005/0289121 A1* | 12/2005 | Nakamura et al. | 707/3 |

* cited by examiner

*Primary Examiner*—Stephen S Hong
*Assistant Examiner*—Gregory J Vaughn
(74) *Attorney, Agent, or Firm*—Ware, Fressola, Van Der Sluys & Adolphson, LLP

(57) ABSTRACT

The invention relates to an optimization of digital content being presented on the display. In a method for optimizing content, the content is analyzed and at least one sequence element is determined. According to this sequence element, said content is portioned into at least two portions, whereby an operation for at least one portion is performed. Also, a control element is provided for at least one other portion.

19 Claims, 4 Drawing Sheets

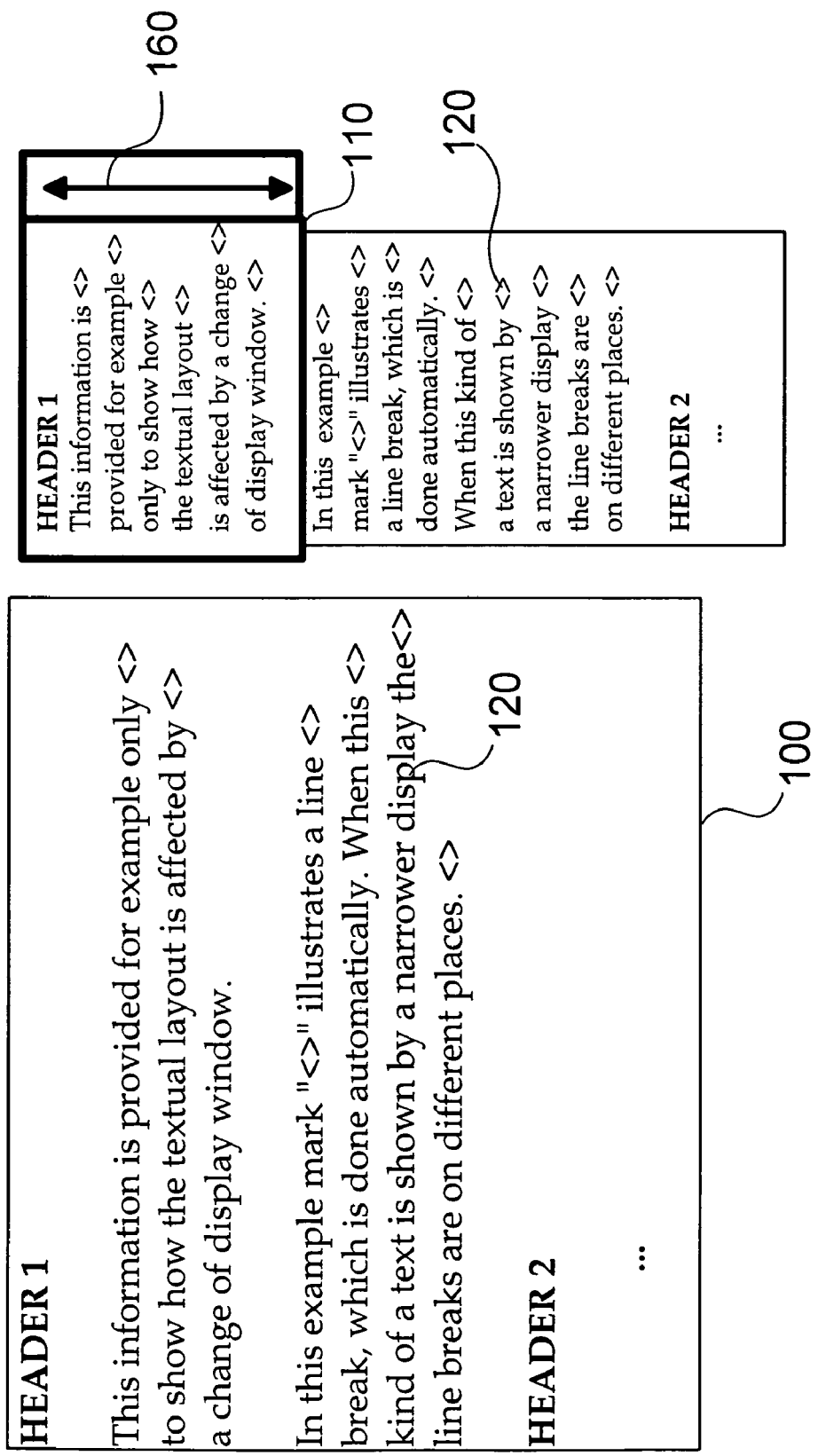

OPTIMIZATION OF CONTENT

FIELD OF THE INVENTION

This invention relates generally to presentation of content on a display and particularly to an optimization of said digital content being presented on the display.

BACKGROUND OF THE INVENTION

Digital content pages (later web pages) transferred in data networks, such as Internet pages, can be browsed to some extent with several types of portable terminals. When web pages are browsed with small portable terminals (e.g. mobile phones, PDA devices, devices that are a combination of a mobile phone and a PDA), whose display is limited in size, the web page being browsed must often be modified to fit the display. In some situations, for example, images or text can be modified into a simpler form, for example, by decreasing the type font or by displaying the image as a link to the image in question.

The web pages are typically arranged on the display of a computer (PC) or the like, in which case the browser window generally corresponds to the size of the display. Therefore the content of the web page can be displayed on the display broadly. However, when the web page is displayed on a display of e.g. a portable terminal, some attention should be paid to the presentation of the content. In order to display web page and its content effectively on the display of a portable terminal, some solutions have already been developed. The known web page browsers of portable terminals can optimize large web pages onto the smaller display by wrapping texts to fit the display width. However wrapping long text sections into a narrow display width may result in considerably long (even tens of display heights long) text sections, which makes navigation on a web page clumsy, because more scrolling is needed to go through the whole content. See for example FIGS. 1a, 1b wherein an example of the situation is presented. In FIG. 1a a textual content (120) is displayed on a computer display view (100), wherein the content fulfils the display effectively. However when the same content (120) is displayed on a portable device display view (FIG. 1b: 110), the content (120) is automatically wrapped into multiple rows. Due to this, the textual content requires more views (i.e. part of the content being seen on a display on each moment) than in a computer display and therefore more scrolling (160) is needed. What should be noticed here, that the example in FIGS. 1a, 1b does not necessarily correspond to the normal situation, because generally the difference between sizes of displays is even more remarkable.

Another example for optimizing content on a smaller (narrower) display is to search semantic textual units from the content, which units are then summarized into a single line, whereby these lines are shown on a display as a hierarchical tree. However the summarization may not necessarily represent the whole content perfectly and may result in as a loss of the information for the user.

It seems that still, regardless of the existing solution, there is a need for an improved solution for optimizing web pages onto a smaller display. Especially there is a need for usable solution that provides a good view to the content but requires less scrolling and avoids too many views.

SUMMARY OF THE INVENTION

Therefore it is an aim of this invention to provide a solution, by means of which content of a web page, a message, for example, e-mail, instant messaging or any other kind of message or any other document can be organized in a new manner on a display.

A method for optimizing content, comprising analysing content; determining at least one sequence element in said content; portioning said content into at least two portions according to said sequence element; performing an operation for at least one portion; and providing a control element for at least one other portion.

A system for optimizing content, comprising at least analysing means for analysing the content and for determining at least one sequence element in said content, wherein the system is capable of portioning said content into at least two portions according to said sequence element and performing an operation for at least one portion and providing a control element for at least one other portion.

A device for displaying content, comprising an optimization system including at least analysing means for analysing the content and for determining at least one sequence element in said content, wherein the optimization system is capable of portioning said content into at least two portions according to said sequence element, whereby the device is configured to perform an operation for at least one portion and provide a control element for at least one other portion.

A computer program product for optimizing content, comprising computer readable instructions stored on a readable medium, said readable instructions when executed by a processor for analysing the content and for determining at least one sequence element in said content, for portioning said content into at least two portions according to said sequence element, performing an operation for at least one portion and providing a control element for at least one other portion.

The current solution has remarkable advantages compared to the solutions of related art. Even though the content is partitioned, the information for the first view can be more extensive compared to the solution where key words are used.

In addition according to this solution, the pages and content can be loaded in parts. This can be done by loading at first only the first portion and then, if needed, by loading the rest of the content. This makes downloading more comfortable to the device—because memory consumption can be decreased—and to the user—because the loading of the most interesting part of the content may become faster.

DESCRIPTION OF THE DRAWINGS

The solution is now described in more detailed manner with a reference to accompanying drawings, wherein few examples of the solution is presented.

FIGS. 1a, b illustrate a simplified example of related textual content wherein the textual content is transmitted to a narrower display, FIGS. 2a,b illustrate an example of how a textual content can be optimized on a narrower display, FIG. 3 illustrate another example of how a textual content can be optimized on a narrower display.

DETAILED DESCRIPTION OF THE INVENTION

The following description is provided for an example. The example relates to web pages and how they are optimized on a portable terminal display. However the solution can be applied to other content as well, e.g. emails and instant messages. Similarly, the optimization is not necessarily needed to be done for portable terminal displays only, but also for displays having a smaller view than supposed. In addition the solution may also be applied to "normal" computer displays. The need for the solution with personal computers or laptops may arise with e.g. documents having long or wide columns. These documents may be desired to be shortened for the sake of clarity.

In the description a term "content" is used for describing the content that can be shown on a web page and can be composed of formulation marks like e.g. hyper text element sequence <p> . . . </p>, <h1> . . . </h1>, <p> . . . </p>, <h1> . . . </h1>, <p> . . . </p>, <h1> . . . </h1>, <p> . . . </p>, <h1> . . . </h1>, wherein <p> stands for a beginning of a paragraph and </p> for ending of a paragraph, <h1> for beginning of a header element and </h1> for ending a header element. Textual content may be other type of content as well. As an example is an email message that is forwarded or replied to, whereby the older messages within the current message can be identified by a mark or a comment or a change of an author. Content can also be, for example, an edited text document in which portions can be detected by different types of formulations (different level headers, paragraphs etc.). Because content that can use the method of this description can be almost anything, and therefore can be formed of different kinds of elements or visual marks; this description uses a general term sequence element for corresponding the criteria that is used for portioning. The sequence element relates to a sequence of identified objects (lines, messages, paragraphs, headers, etc.), which can be identified differently. Therefore the man skilled in the art will appreciate the broad meaning of the phrase "sequence element".

Method steps for the solution comprise analysing the content that needs optimization. The analysis comprises a determination of whether a content is too long or too broad, whereby an optimization is needed. The determination can be carried out by comparing the content to a certain limit value that can be e.g. a number of pixels in height or a number of characters. The limit value can be set by the device or by the user. After the determination the content can be optimized. It should be noted that the invention can also be applied for wide columns, when using a computer for example.

Figures 2A, 2B:
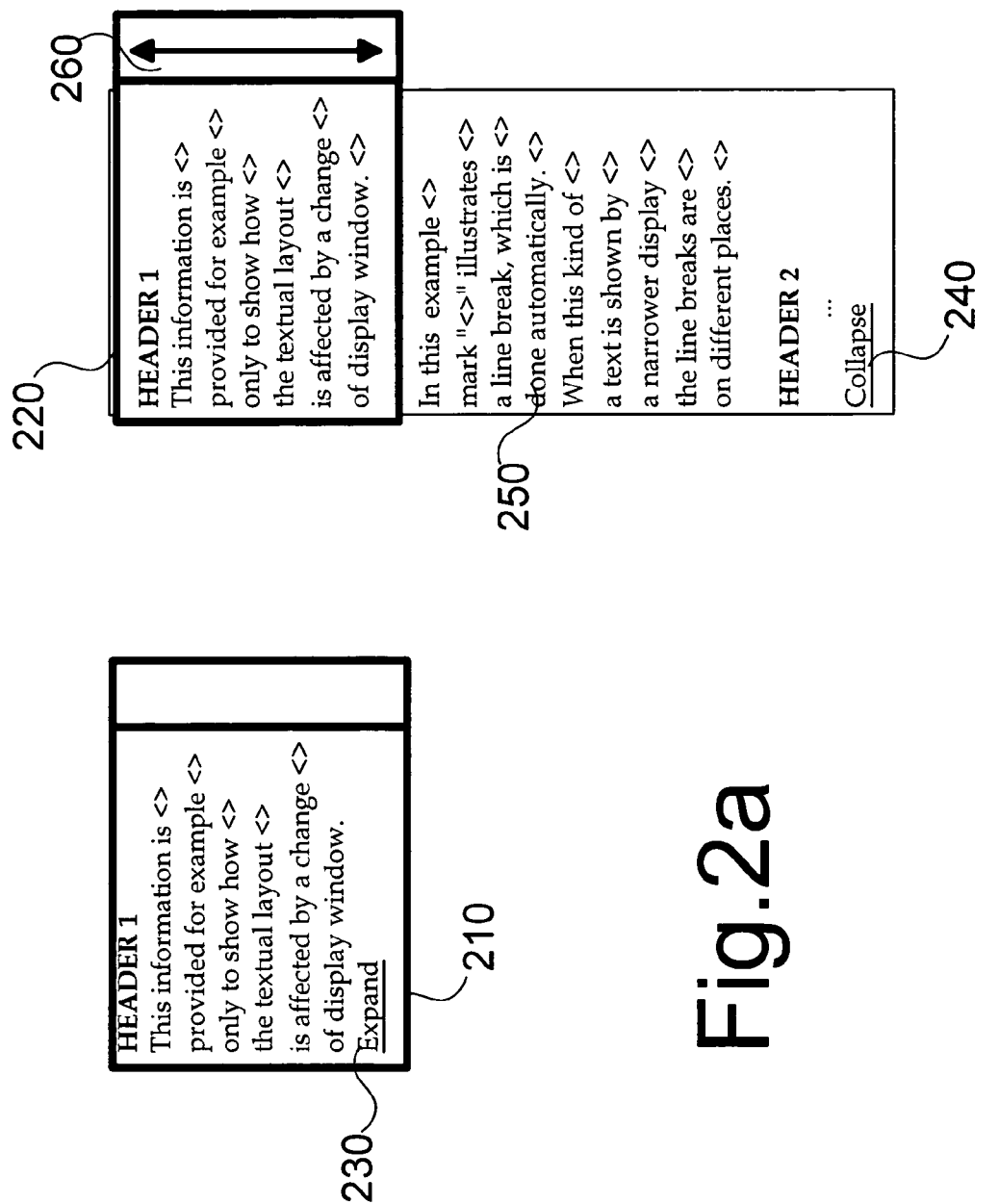

The optimization can be implemented in such a manner that the content is portioned into two parts or more than two parts. In FIGS. 2a, b the content is portioned into two parts. For the first part an operation is performed, which relates to the presentation. The operation can be automatic. Due to the operation, the first part is presented on a display, and the intention for presenting the first part, may be to present the first part as one view 210 (FIG. 2a), whereby it can be seen without scrolling. In some cases the one view presentation may be difficult, and hence, the target may be to present the first part with as few views as possible. To the end of the first portion, a control element, for example a link, a menu, a push button, 230 "view more" is placed. When the user selects that link 230, the rest of the textual content 250 is brought visible on the display. The view 220 (FIG. 2b) comprises the same content as the first view 210, in connection to a scrolling means 260. By the scrolling means 260 the textual content 250 can be browsed to its end. At that point, when the whole content is available, a link 240 "collapse" is placed at the end of the content 250. Due to the selection of the collapsing link 240, the user is brought back to the first view 210 where the first portion of the content is shown.

Figure 3A:
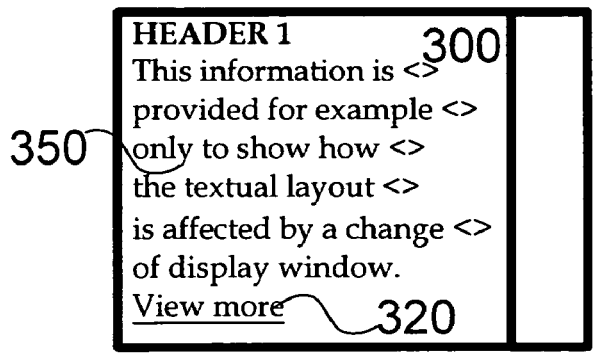
Figure 3B:
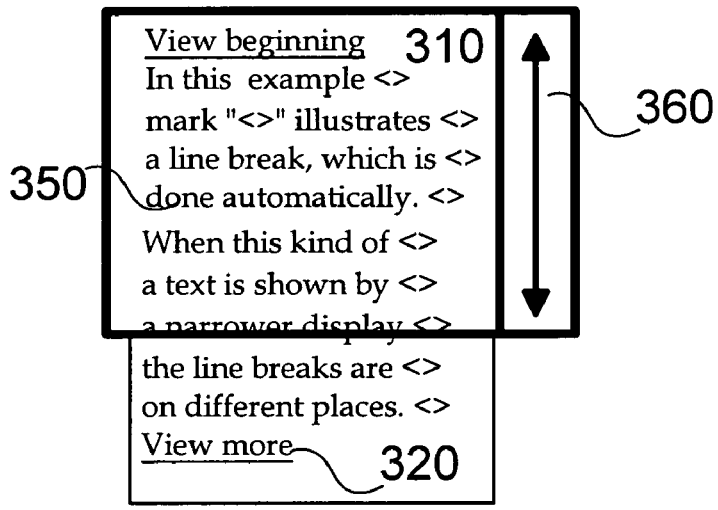
Figure 3C:
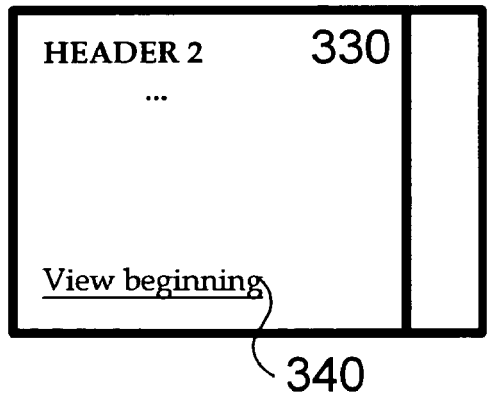

Another example is presented on FIGS. 3a-3c, wherein the content 350 is divided into more than two portions and the solution is implemented in more steps. In this example a link 320 "view more" is placed at the end of the first portion for the first view 300 (FIG. 3a), which link 320 reveals the second view 310 (FIG. 3b) comprising the second portion of the content. At the end of the second portion there is also a link 320 "view more", which link 320 reveals the third view 330 comprising the third portion and so on. This can be continued till the portions of content are viewed. The last view may comprise a link 340 "view beginning" for going back to first view 300. In this example, there is a possibility to show only one or few portions at the time, whereby the link for viewing more inserts the following portions to the viewed content. This means, that a following portion can hide the previous portion, or the following portion may be added to the previous portion and hence increasing the displayable content. Link "view beginning" can be attached to the beginning of the next portion for returning to the beginning. Sometimes (as in FIG. 3b) scrolling 360 may be needed if the portion to be displayed is larger than the view.

It will be appreciated by a skilled person that the "view more", "view beginning" or similar function does not necessarily need to be an element that is rendered onto the document. It may as well be a function that is shown on a separate menu, etc.

When dividing textual content into portions, the division can be done before headers, that are determined by a formulation mark, such as a header element, e.g. <h1> . . . </h1>. Due to this kind of portioning, the portions include headers that belong together with their other content. If headers are not indicated with any header element, the possible headers can be found by some other detection method. For example the header may be detected by assuming that a piece of textual content fulfilling predefined conditions is a header. These conditions can be e.g.

- that the text piece has a single line which means that the text piece is not divided into multiple lines by the author using linefeeds. If division to multiple lines occurs because of wrapping the text by the browser, that does not count.
- that the text piece is separated from content above and below either by linefeed(s) or margins.
- that the text piece has more highlighting font style, as bold, italics, underline, and/or bigger font size than the actual content.
- that the text piece has two lines that can be detected by different font sizes in relation to the other. As an example is a newspaper or web site, where the header has also a pre- or a post-line, having smaller font than actual header.

Sometimes there may be a need to portion the textual content within one paragraph. If the number of line break marks, such as <br> is large, the need for portioning may arise. Hence the current solution may be applied also here by determining the number of the line break elements and by dividing the content e.g. in the middle.

The previous example relates mainly to web pages and textual content therein. However, the solution can be applied to other situations as well. For example the solution can be used with emails in portable terminals and in other devices. Email messages can be relatively long for portable terminal windows, whereby a lot of scrolling would be needed if the message was shown in its full length. In case of email, the portions can be formed according to different messages in the email chain, which email chain can be considered as a sequence of messages. The newest email can form the first portion, the message below it can be the second portion, and the message below the second message can form the third portion. The messages can be identified by sequence elements that can be, in the case of emails, e.g. prefixes or marking lines that indicates the former messages. As an example of prefixes are marks ">", ">>", etc. As an example of the marking lines are "- - -" that can be added at the beginning and at the end of the original message. This kind of markings can be used also to identify different messages. Also other detection methods can be used for determining single messages. For example subject lines, author information, dates or similar can be utilized in the portioning.

The method can also be used with instant messaging applications (e.g. different messenger applications and web conferencing, etc.), that typically present the discussion as a list of messages. That list can easily get remarkably long, so it can be portioned for instance by utilizing sequence elements, such as end of a message. It is possible to:

show long messages optimised so that only a small portion of them is visible, and the whole message can be seen by selecting the "view more" link.

show messages matching to some criteria optimised so that only a small portion of them is visible, and the whole message can be seen by selecting the "view more" link. In this the sequence element may relate to a criteria that is. for instance, an age of a message, e.g. messages posted more than one hour ago.

In addition to links for viewing next or previous portion, links can be provided for few or all next or previous portions and/or to first or last portion. In case of emails and instant messaging, the link can include some additional information about the portion, such as a original sender of that part of the message, or whether that portion contains an attachment. Similarly the links being added to other textual content do not need to be static text as described in the example. The link can also present some information on the content it would reveal, for example a header or a beginning of the following text. Or the link can have some information about the number of a portion, such as "portion ⅗".

Some applications have a feature that enables reading of the document aloud for the user. In particular, when the user is looking for some information, listening is a slower process than visual browsing through the content. The solution described previously also provides benefits for this kind of applications, because not that much unnecessary contents will be read by the application. In this example, control elements may also be accessible by voice commands.

Optimization of a part of the content may affect to the overall layout of the whole content. This might occur for instance if the optimised paragraph is inside a table cell; making height of the paragraph smaller may also make the height of the table smaller.

The optimization of the content can be implemented on a client side i.e. on a device. However sometimes, it may be more practical to carry out the implementation in an email or instant messaging or web page optimisation server in a network. This way the implementation on a device may remain lighter and handling of content may be faster. This kind of server side implementation may also decrease downloading costs of a terminal because only the needed part is downloaded and rendered instead of all.

As stated above, the content can be portioned in different ways and based on different criteria. What is common between them, is that in the method the sequence element is determined, meaning that a sequence element is detected or defined by the device or the system. According to this sequence element (which can be a different element depending on the content in question) the content may be portioned in such a manner that the first portion is shown at first after which the following portions are brought forth. According to this the content browsed becomes easier and more user friendly. The solution according to the invention can be applied to 3D content too, using the same principles as with 2D content. When applying this to 3D content, optimization can be applied in respect to one or more dimensions. In the method portioning criteria can be based, for example, on certain element or elements, certain attribute or attributes, property or properties, quality or qualities, type or types, whereby it is understood that portioning criteria is not limited to those that are mentioned in the description.

Figure 4:
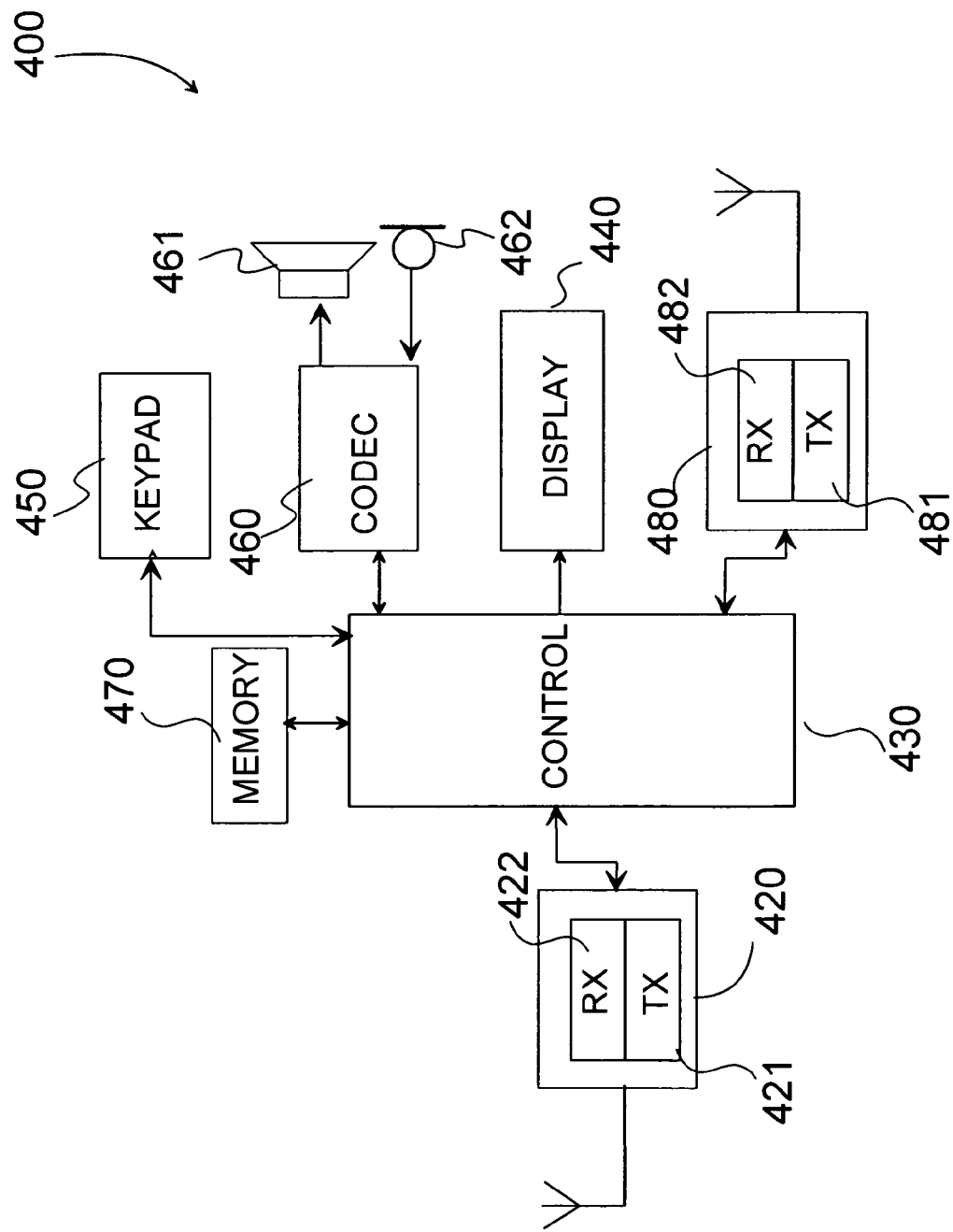
FIG. 4 illustrates an example of a device.

An example of the device is illustrated in FIG. 4. The device 400 comprises a communication means 420 having a transmitter 421 and a receiver 422 or the device is connected to such. There can also be other communicating means 480 having a transmitter 481 and a receiver 482 as well. The first communicating means 420 can be adapted for telecommunication and the other communicating means 480 can be a kind of short-range communicating means, such as a Bluetooth™ system, a WLAN system (Wireless Local Area Network) or other system which suits local use and for communicating with another device. The device 400 also comprises a display 440 for displaying visual information, e.g. web pages. In addition the device 400 may comprise an interaction means, such as a keypad 450 for inputting data etc. In addition or instead of the keypad 450, the device can comprise a stylus, when the display is a touch-screen display. The device 400 can also comprise audio means 460, such as an earphone 461 and a microphone 462 and optionally a codec for coding (and decoding, if needed) the audio information. The device 400 also comprises a control unit 430 for controlling functions and running applications in the device 400. The control unit 430 may comprise one or more processors (CPU, DSP). The device further comprises memory 470 for storing e.g. data, applications, computer program code. The method itself can be implemented by a program code that can be stored on a memory of the device.

The foregoing detailed description is provided for clearness of understanding only, and not necessarily limitation should be read therefrom into the claims herein.

What is claimed is:

1. A method, comprising:
analysing content by comparing the height of the content to a limit value;
determining at least one sequence element in said content;
portioning said content into at least a first portion and a second portion according to said sequence element, wherein the first portion and the second portion have respective heights at least as large as the limit value;
performing an operation related to presentation of at least the first portion; and
associating a control element for at least the second portion to an end of the first portion;
wherein the control element is configured to cause presenting of the second portion at the end of the first portion.

2. The method according to claim 1, wherein said operation related to presentation of at least the first portion comprises displaying at least the first portion.

3. The method according to claim 1, wherein presenting the second portion comprises selecting the control element and displaying the second portion.

4. The method according to claim 1, wherein the control element is configured to cause hiding of the second portion.

5. The method according to claim 1, further comprising displaying at least the second portion together with at least the first portion.

6. The method according to claim 1, further comprising displaying at least the second portion separately from the first portion.

7. The method according to claim 1, wherein said sequence element is based on one of the following: a column break, a specific number of line breaks, a header break.

8. The method according to claim 7, wherein the header break is determined by one of the following: a header formulation mark, a text piece having a single line, a text piece being separated from rest of the text, a text piece having more highlighting text style, a text piece having distinguishable two lines.

9. An apparatus, comprising:
an optimization system for analysing content by comparing the height of the content to a limit value, and for determining at least one sequence element in said content, wherein the optimization system is capable of portioning said content into at least a first portion and a second portion according to said sequence element, wherein the first portion and the second portion have respective heights at least as large as the limit value, and
a control unit for performing an operation related to the presentation of at least the first portion, and for associating a control element for at least the second portion to an end of the first portion,
wherein the control element is configured to cause presenting of the second portion at the end of the first portion.

10. The apparatus according to claim 9, further comprising a display configured to display said at least first portion after portioning.

11. The apparatus according to claim 9, further comprising a display configured to display the second portion when the control element is selected.

12. The apparatus according to claim 9, further comprising a display configured to hide the second portion when the control element is selected.

13. The apparatus according to claim 9, further comprising a display for displaying at least said first portion together with at least said second portion.

14. The apparatus according to claim 9, further comprising a display for displaying at least said first portion separately from at least said second portion.

15. The apparatus according to claim 9, wherein the optimization system is capable of portioning based on one of the following criteria: a column break, a specific number of line breaks, a header break.

16. The apparatus according to claim 15, wherein the optimization system is capable of determining the header break by one of the following: a header formulation mark, a text piece having a single line, a text piece being separated from rest of the text, a text piece having more highlighting text style, a text piece having distinguishable two lines.

17. A computer readable storage medium embedded with a computer program, comprising programming code for:
analysing content by comparing the height of the content to a limit value, determining at least one sequence element in said content,
portioning said content into at least a first portion and a second portion according to said sequence element, wherein the first portion and the second portion have respective heights at least as large as the limit value,
performing an operation related to presentation of at least the first portion, and
associating a control element for at least the second portion to the end of the first portion,
wherein the control element is configured to cause presenting of the second portion at the end of the first portion.

18. The computer program according to claim 17, wherein presenting the second portion comprises selecting the control element and displaying the second portion.

19. The computer program according to claim 17, wherein the control element is configured to cause hiding of the second portion.

* * * * *

UNITED STATES PATENT AND TRADEMARK OFFICE
CERTIFICATE OF CORRECTION

PATENT NO. : 7,509,575 B2 Page 1 of 1
APPLICATION NO. : 11/114211
DATED : March 24, 2009
INVENTOR(S) : Mäkelä

It is certified that error appears in the above-identified patent and that said Letters Patent is hereby corrected as shown below:

1. Title page Item [75] Inventor, "Espoo" should be --Tampere--

Signed and Sealed this

Twenty-sixth Day of May, 2009

JOHN DOLL
*Acting Director of the United States Patent and Trademark Office*